(12) United States Patent
Darbeau et al.

(10) Patent No.: US 6,602,967 B1
(45) Date of Patent: Aug. 5, 2003

(54) USE OF DEAMINATIVELY-GENERATED CARBOCATION AS POLYMERIZATION INITIATORS

(75) Inventors: Ron W. Darbeau, Lake Charles, LA (US); Mark S. Delaney, Lake Charles, LA (US); Ulku Ramelow, Lake Charles, LA (US)

(73) Assignee: McNeese State University, Lake Charles, LA (US)

( * ) Notice: Subject to any disclaimer, the term of this patent is extended or adjusted under 35 U.S.C. 154(b) by 0 days.

(21) Appl. No.: 09/615,250

(22) Filed: Jul. 13, 2000

(51) Int. Cl.[7] .............................. C08F 4/04; C08F 10/10; C08F 12/08
(52) U.S. Cl. ..................... 526/217; 526/218.1; 526/219; 526/308; 526/340.2; 526/346; 526/348.7; 585/527
(58) Field of Search .............................. 526/218.1, 346, 526/219, 217, 308, 340.2, 348.7; 585/527

(56) References Cited

U.S. PATENT DOCUMENTS 5,115,055 A * 5/1992 Dais et al. .................. 526/225
5,629,394 A * 5/1997 Cheradame et al. ..... 526/346 X
5,990,255 A * 11/1999 Priddy et al. ................ 526/193

OTHER PUBLICATIONS

Darbeau et al, "Deaminatively Generated Carbocations as Initiators of Styrene Polymerization", Org. Lett., 1(5), 761–762, 1999.*

* cited by examiner

*Primary Examiner*—Fred Teskin
(74) *Attorney, Agent, or Firm*—Kean, Miller, Hawthorne, D'Armond, McCowan & Jarman, L.L.P.

(57) ABSTRACT

Deaminatively generated carbocations to initiate addition polymerization are disclosed. The high reactivity of the carbocation allows initiation of polymerization with virtually all alkenes, alkynes, alicyclic and aromatic monomers, regardless whether multisubstituted or conjugated. In addition, the carbocation initiates a polymerization reaction that generates an extremely high molecular weight polymer. In particular polystyrene of viscosity average molecular weight of approximately $10^6$ was obtained.

25 Claims, No Drawings

USE OF DEAMINATIVELY-GENERATED CARBOCATION AS POLYMERIZATION INITIATORS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates, generally, to use of initiators for cationic polymerization, and specifically, to use of carbocations formed through deamination as initiators of addition polymerization.

2. Description of Related Art

In general, four reaction intermediates exist for initiation of addition polymerization: Zeigler-Natta catalysts, carbocations, free radicals and carbanions. Addition polymerization is readily accomplished via free radicals and carbanions but conventional initiation via carbocations is limited principally by low initiator reactivity.

Cationic polymerization represents an important body of techniques for the synthesis of many polymers possessing unique structures and properties. The cations used to initiate polymerizations include protons, oxonium ions and carbocations. Two chemical sources of carbocations are currently in use:

(1) Stable carbocation salts such as hexafluoroantimonates of trityl and tropylium carbocations. These species are able to initial polymerizations of reactive monomers such as styrenes but they are too stable to initiate polymerizations of less reactive monomers such as ethene (ethylene) and isobutene.

(2) Haloalkane/Friedel-Crafts (F-C) complexes. These systems generate carbon-based electrophiles which are not "free" carbocations. The carbocations generated are more reactive than carbocations salts but are still unable to initiate polymerization of monosubstitued alkenes and ethene. Additionally, the utility of this system is compromised by the inability to identify the actual initiating species (polarized haloalkane, carbocation, ion pair, or ion multiplet), extreme moisture sensitivity, and limited catalyst solubility in many of the common solvents.

Carbocations, also known as carbenium ions, generated through deamination are known in the art to be highly reactive. Deamination is defined to mean the class of reactions in which nitrogen or a nitrogen-containing molecule is extruded during the course of reaction to generate a reactive intermediate. Dediazoniation is the step along the reaction pathway when the nitrogenous molecule is lost.

Several methods exist for accessing deaminatively generated carbocations that are formed as part of an nitrogen-separated ion pair or nitrogenous-molecule-separated ion pair (NSIP). These highly reactive cations are inaccessible via solvolytic routes. The carbocations formed through this deaminative approach are discussed by the inventor and others in *A Study of Essentially Free Carbocations Derived via Diazonium and Oxo Diazonium Ions in the Liquid Phase*, Journal of Organic Chemistry, Vol. 64, No. 16. Deaminative methods for generating these highly reactive carbocations include:

nitrosoamide thermolyses
nitroamide thermolyses
acidification of diazoalkanes and triazenes
nitration and nitrosation of N-alkyl-O-acylhydroxylamines, amines, and salts of amides
acylation of salts of N-nitroso and nitroamines
decomposition of alkadiazenyl-2-oxide esters The critical component is the presence of nitrogen in the carbocation precursors to form N2 or NO as the inert molecule. The presence of the inert molecule blocks the carbocation from its counterion to allow reaction with any other nucleophiles present, e.g., the solvent or in this invention, the monomer. The NSIP can be depicted by:

R=hydrogen and/or any compound that forms a secondary, tertiary or resonance-stabilized carbocation such as, but not limited to, CH3, benzyl ring
R'=any [organic] compound
X=any acid function, including but not limited to CO and $SO_2$ Intramolecular modes of deamination by appropriate modification of the amine or by direct attachment to a nitrous acid equivalent are known in the art. See White, et al., J. Am. Chem. Soc. 1992, 114, 8023. In unimolecular generation of carbocations from N-nitroso- and N-nitroamides, the substrates already possess built-in groups so that on thermolysis, diazonium ions (or analogues) are formed; the latter then dediazoniate to the corresponding carbocation(s). For example, an N-alkyl-N-nitrosoamide rearranges on heating to form an unstable trans-diazotate ester which then fragments into an intimate ion pair containing a diazonium ion. The latter readily deadizaoniate to form a nitrogen-separated ion pair.

U.S. Pat. Nos. 5,032,653 and 5,336,745 disclose the addition of nitrogen-containing compounds as functional groups to polymers. Similarly U.S. Pat. Nos. 5,444,135 and 5,629,394 disclose the addition of nitrogen containing compounds as functional groups to polymers by living cationic polymerization. The processes disclosed discuss cationic polymerization using a cationic catalyst, preferably Freidel-Crafts catalyst, in the presence of monomer and the nitrogen initiator compound. The nitrogen initiator releases a nitrogen functional group that then binds with the developing polymer. Although this loss of nitrogen functional group may be viewed broadly as a deaminative step, the compound that releases the nitrogen group is not disclosed or claimed to initiate the polymerization in any way.

U.S. Pat. No. 5,223,591 discloses a carbocation initiator formed through activation of a sulfonium salt. The distinguishing feature of the invention is the retention of the sulfide by covalent bond with the cationic fragment that initiates polymerization. The carbocation is activated by thermal, photochemical or electron bombardment of a heterocyclic, aryl substituted or with an aryl ring fused sulfonium salt with a non-nucleophilic anion which causes the ring to open. The carbocations discussed do not disclose deamination as the formative step, nor the inclusion of nitrogen or nitrogen containing compounds to form the carbocation.

U.S. Pat. No. 5,376,744 discloses a process for polymerizing olefinic monomers using carbocations known in the art in a medium of supercritical carbon dioxide. The use of supercritical carbon dioxide rather than hydrocarbon solvents allows polymerization at higher temperatures, i.e., between 31 to 60° C. without decreasing the molecular weight of the resulting polymer. The supercritical carbon dioxide is not claimed to initiate the reaction in any way.

U.S. Pat. Nos. 4,112,209 and 4,161,573 disclose a process for making polystyrene with molecular weight between 1,000 and 50,000 using "commonly known" cation generators including protonic acids and Freidel-Craft catalysts in a solvent. The claimed process is limited to styrene contacted with cation generators in 3 or more stages while maintaining substantially isothermal conditions between 0° C. and 120° C., with styrene always present in greater stoichiometric amount in relation to the cation. The formation of carbocations by deamination in particular is not discussed as a, "commonly known" cation generator.

Carbocations formed through thermolysis of N-nitrosoamides to initiate polymerization form polystyrene yielding $10^6$ molecular weight is discussed by the inventor and others in *Deaminatively Generated Carbocations as Initiators of Styrene Polymerization*, Organic Letters 1999, Vol. 1, No. 5, which is incorporated herein by reference. In that study, the polystyrene produced was at least one order of magnitude higher than that commercially available.

Polymers with high molecular weight and/or high melting points have potential commercial viability but their production is currently limited by existing commercial methods. Polymerization by free radical initiators terminates the polymer chain too quickly, preventing the formation of long polymer chains that raise the average molecular weight of the polymer and increase its melting point. Polymerization initiated through carbanions proceeds too slowly, i.e., over several days, to have much commercial viability.

Polymer melting point is a function of both mass and structure, tacticity, and crystallinity. Zeigler-Natta catalysts can achieve high molecular weight through the polymer tacticity as well as long chain length.

Polystyrene currently in commercial use melts at 100–104° C., excluding its use from high heat commercial applications. Polystyrene with a melting point greater than 165° C. has been demonstrated using Zeigler-Natta catalysts to produce syndiotactic polymer. The disadvantage of this process is the pyroforic nature of the catalysts, causing safety issues in handling and production.

The various polymerizations and copolymerizations of isobutylene to produce polyisobutylene, polybutene and butyl rubber probably represent the most important commercial applications of cation-induced polymerization. Commercial polyisobutylene typically has an average molecular mass of the order of $10^5$ and a melting point of 100° C.

OBJECTS OF THE INVENTION

It is an object of the present invention to provide a deaminatively-generated carbocation initiator for initiating addition polymerization.

It is another object of the present invention to provide a method for polymerizing monomers using a deaminatively-generated carbocation.

It is another object of the invention to provide a method for producing high molecular weight polymers using a deaminatively-generated carbocation initiator.

It is another object of the invention to provide a method for producing copolymers using a deaminatively-generated carbocation initiator.

It is a further object of the invention to provide a method for producing high molecular weight oligomers using a deaminatively-generated carbocation initiator.

SUMMARY OF THE INVENTION

A method for using a carbocation generated through deamination as an initiator in addition polymerization is provided. The carbocation formed through deamination is highly reactive, and initiates a polymerization reaction with any monomer, oligomer, or polymer capable of cationic polymerization.

An advantage of the invention is the generation of a high molecular weight polymer.

A further advantage of the invention is its ability to initiate reactions with less reactive monomers.

A feature of the invention is polymerization without the necessity for a solvent medium.

A further feature of the invention is increased safety in handling of the initiator composition.

A further feature of the invention is polystyrene with a melting point greater than 165° C. and average molecular weight of $10^6$.

These and other objects, advantages, and features of this invention will be apparent from the following description.

DETAILED DESCRIPTION OF THE INVENTION

This invention demonstrates that deaminatively generated carbocations are successful initiators of addition polymerization. The novel use of this facile mode of carbocation generation in the polymerization or oligomerization of unsaturated monomers is disclosed. The high reactivity of the carbocation allows initiation of polymerization with less reactive monomers such as monosubstituted alkenes. Activation of ethene has been demonstrated. The high reactivity allows initiation with virtually all alkenes, alkynes, alicyclic and aromatic monomers, regardless whether multisubstituted or conjugated, or unstabilized. In addition, the carbocation initiates a polymerization reaction that generates an extremely high molecular weight polymer. In particular, polystyrene of viscosity average molecular weight ~$10^6$ was obtained.

Carbocations generally are formed from the heterolysis of some weak, polar bond in polar solvents in which the departure of a good leaving group and the formation of a resonance and/or inductively stabilized cation are involved. Ion pairs can be generated readily in polar solvents, with a subsequent step involving the formation of a solvent-separated ion pair. Without being bound, it is believed that in the nitrosoamide decomposition, a third, inert body is generated directly between the gegenions, and this NSIP essentially determines the subsequent chemistry.

Using the deaminative approach, it is possible to generate carbocations in nonpolar solvents such as benzene and cyclohexane, or without the presence of solvent at all. Specific solvation of the carbocations appears to be unnecessary presumably because of the low activation energy for dediazoniation (loss of nitrogen or nitrous oxide). This low activation energy allows the resultant carbocation to be formed with minimal solvent participation and maximal positive charge on the electrondeficient center. Additionally, the temporary screening of the cation from the counterion by the physical presence of the IM results in the existence of an essentially free cation.

Scheme I depicts available carbocation precursors to form Diazonium and Oxo Diazonium Ions. In reaction I, an N-alkyl-N-nitrosoamide, 1, rearranges on heating to form an unstable trans-diazotate ester, 2, which then fragments into an intimate ion pair, 3, containing a diazonium ion. The latter readily dediazoniates to form a nitrogen-separated ion pair, 4. The carbocation in 4 can react with nucleophiles that are present. Scavenging of the cation by the counterion can occur only after the inert molecule (IM) diffuses sufficiently out of the pocket between the ions. Diazoalkanes (e.g., 5) on general-acid protonation appear to lead directly to the intimate ion pair, (reaction II) and eventually the same suite of particles in the IMSIP (inert-molecule-separated ion pair), [also called nitrogen- or nitrogenous-molecule-separated ion pair in the present invention], as were formed in the thermolysis of 1. N-Alkyl N nitroamides, 6, are, like their nitroso analogues, thermolabile and rearrange on heating via diazoxy esters, 7, to form a nitrous oxide-separated ion pair, 9 (reaction III). An analogue of 9 arises from the labile N-alkyl-N-nitroso-O-benzoylhydroxylamine, 11, formed by nitrosation of the N-alkyl-O-benzoyl precursor, 10 (reaction IV). Alternative routes to 4 and 9 exist among them are the acylations of anti-diazotates, 12 (reaction V), and salts of nitroamines, 13 (reaction VI), respectively.

The carbocations formed by this approach are extraordinarily reactive, and they probably represent as free a carbocation as can be generated in liquid media. While not wishing to be bound thereby, it is believed that the nitrogeneous molecule(=nitrogen, nitrous oxide), by virtue of its physical separation of the ions for a finite period of time, limited by the rate of diffusion of the nitrogeneous molecule into the chosen medium, plays a pivotal role with respect to competing reaction modes, allowing a carbocation-monomer interaction to not only compete but potentially to dominate the reaction. In the context of this invention, the carbocations formed are intercepted by vinylic monomers to produce a series of daughter carbenium ions each capable of reacting with more monomer until polymerization occurs.

Thus, the use of solvent is optional. However, solvent may be necessary for solid and gaseous monomers as well as

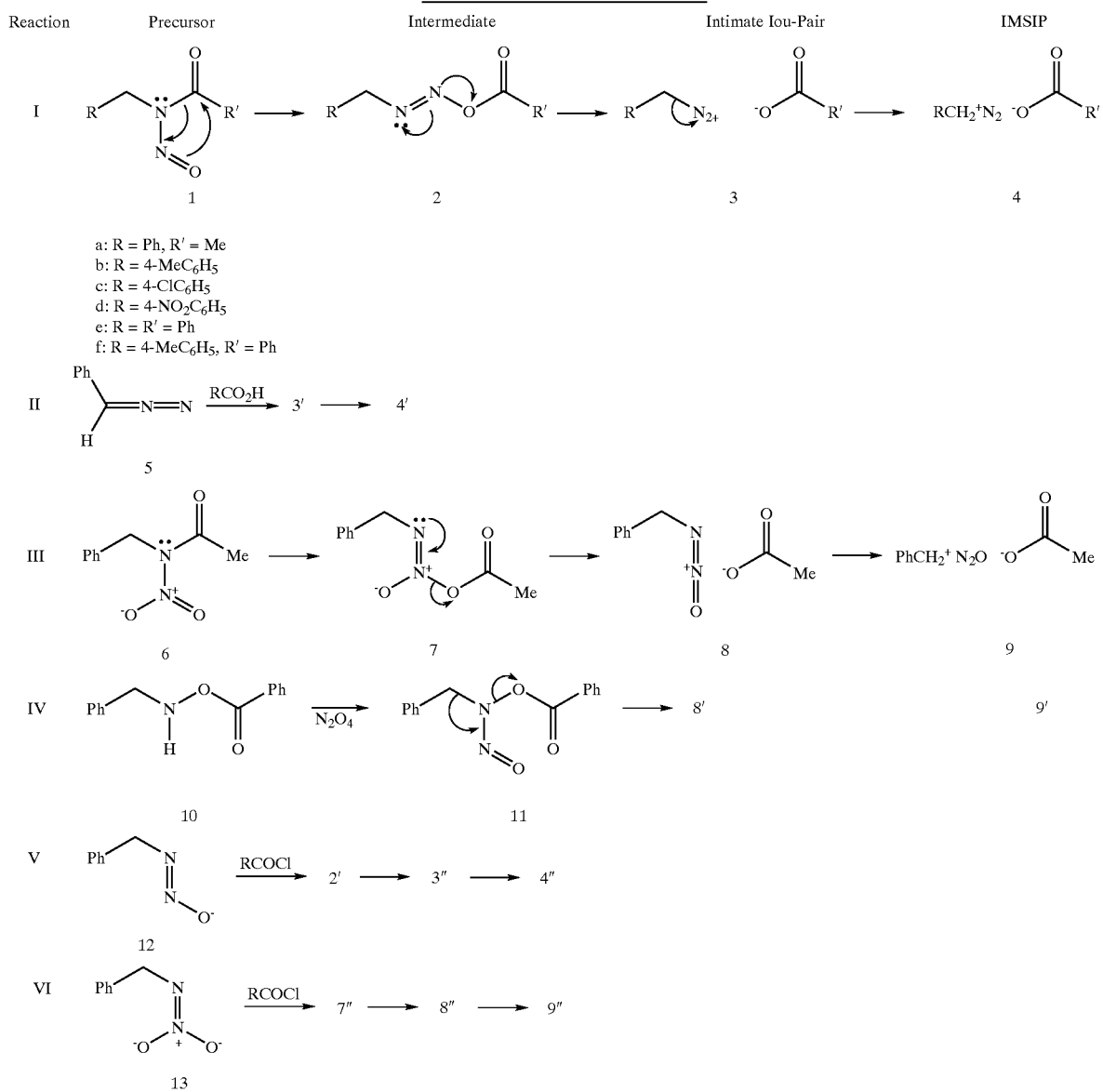

potentially those that exotherm. Additionally, the solvent should be chosen with sufficient solubility to avoid precipitation polymerization. In a preferred embodiment, the solvent should be non-acidic, aprotic and of low nucleophility such as cyclohexane, hexane, and methylene chloride.

N-Nitrosoamides are favorable sources of carbocations because of the mildness of the conditions required to generate cations; the high reactivity of the unsolvated carbocations formed, the solubility of the precursors in a wide range of solvents (from carboxylic acids through alcohols to hydrocarbons), homogeneity of the reactions, wide range of decomposition temperatures possible (−20 to ~100° C.), straightforward chemistry (no catalysts, no isomerizations of the products), and excellent product balance.

Thermolyses of N-alkyl-N-nitrosamides produce nitrogen separated ion pairs (NSIPs) containing exceedingly reactive carbocations.

substituted benzyl groups around the N-nitroso moiety results in a low half-life, and because the reactivity of the benzyl cation generated could be readily modified by appropriate substitution at the 2, 4, and 6 positions. The half-life of N-benzyl-N-nitrosopivalamide at 40° C. is approximately 7 minutes, consequently a reaction time of 3 hours (=12 half-lives) was used. A moderate temperature of 40° C. was chosen to minimize the thermally induced free-radical pathway but to still allow relatively rapid carbocation.

For polystyrene, hexane was chosen as the solvent because it is inert to the cation under consideration, it is relatively volatile, and readily dissolves both the monomer and the nitrosoamide. For isobutylene, cyclohexane was chosen for the same reasons. Any difference in the choice of solvent was governed by concern to avoid precipitation polymerization which would unnecessarily halt the reaction based on saturation of the solvent by the formed polymer.

The reactivity of the initiator can be varied by changing the attached groups on the benzyl structure of the tertiary

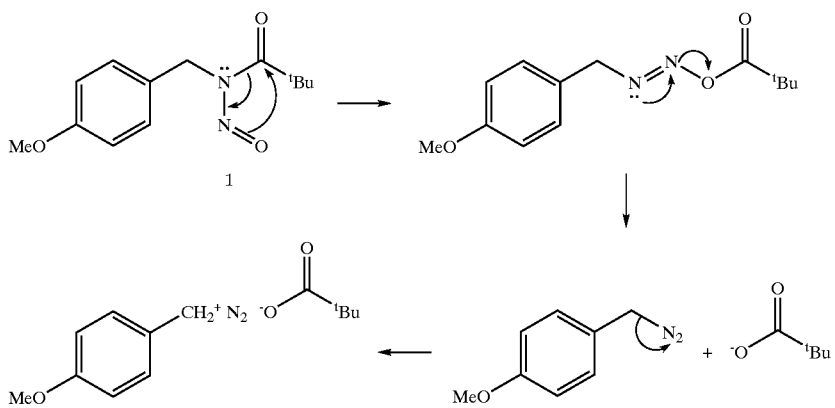

These exceedingly reactive cations can be chosen so that β-eliminations and rearrangements are not possible and reaction with nucleophiles is their only fate. The nucleophiles available to them are the counterion and the available monomer or oligomer. The reaction with the monomer must occur before diffusion of nitrogen from between the ions as the latter process leads to internal collapse of the ion pair to form the corresponding ester.

The rate of diffusion of the nitrogeneous molecule from between the ions decreases as the temperature decreases. This slower diffusion of the nitrogeneous molecule results in slower exposure of the ions to each other and allows the carbocation more time to react with the monomer or oligomer molecules before being scavenged by the counterion. The temperature of reaction must be maintained low enough to minimize free radical pathways, i.e. below 100° C. The temperature chosen for the reaction affects both the rate of decomposition of the carbocation precursor compound, and the minimization of free radical polymerization. Thus, the selection of the method for generating the carbocation will be an optimization of these two boundaries. Those skilled in the art will be able to determine the rate of decomposition for the chosen precursor to set the reaction temperature while maintaining the overall limitation of 100° C. to minimize free radical polymerization. Similarly, those skilled in the art will be able to determine the reaction time based on sufficient time for the applicable carbocation precursor to decompose appreciably.

In a preferred embodiment, N-4-Substituted-benzyl-N-nitrosopivalamides are used to polymerize styrene and isobutylene because the steric bulk of the tert-butyl and carbocation, i.e. MeO, NO2, etc. The carbocation precursor can be a single compound, e.g., N-nitroso- and N-nitroamides. It can also be a mixture of compounds, e.g., diazoalkanes with acids, N-alkyl-O-acylhydroxylamines with $N_2O_4$, etc.

The highly reactive, first-formed 4-methoxybenzyl cations generated on thermolysis react with monomers to generate a hierarchy of intermediate daughter ions that are themselves of sufficient reactivity to extend propagation of the chain. Polymerization was successfully initiated with both a secondary carbocation intermediate in the styrene reaction and the less stable tertiary carbocation intermediate in the isobutylene reaction. Additionally, the pivalate anion is both bulky and poorly nucleophilic (n~2.7); consequently it is both sterically and electronically inept at capturing the growing polymer chain. The high reactivity of the parent ion, the low nucleophilicity, and the steric bulk of the pivalate ion apparently leading to expansive chain growth, resulting in a polymer of large mass and concomitant high melting point.

Despite its ability to polymerize styrene, the 4-methoxybenzyl cation is among the least reactive of the simple 4-R-substituted benzyl cations due to the electron-releasing ability of the methoxy group. As the R-group is varied from MeO to $NO_2$ the stability of the 4-R-benzyl cation decreases. Although the yields are low, the system has not been optimized, even for the 4-methoxybenzyl cation. It is believed that tandem use of more highly reactive substituted-benzyl carbocations (e.g., those containing nitro groups in the 2,4, and/or 6 positions) and less nucleophilic counterions (e.g., triflate) would lead to larger yields of more massive polymer.

Method of preparation for N-Alkyl-N-nitrosoamides

The N-Nitrosoamides were freshly prepared for each experiment because the compounds are labile in the presence of acids, bases, heat and moisture. All syntheses and reaction of the N-alkyl-N-nitrosoamides were performed in the dark. The alkyl groups employed were benzyl, 4-methoxybenzyl, 4-nitrobenzyl, and cyclohexyl; and the acyl group employed was trimethylacetyl (pivalyl). A clean oven-dried Morton flask equipped with a stir bar was evacuated and backfilled and purged with argon at least six times prior to use. Clean, vacuum-dried syringe/needle assemblies were flushed ten times with argon before using.

A mixture of the appropriate N-alkylamide (5 mmol), anhydrous NaOAc (2.5 g, 30 mmol), and anhydrous $Na_2SO_4$ (5 g) was dried at oil pump vacuum for at least 5 hours. It was allowed to equilibrate to atmospheric pressure with argon and the flask was capped with a serum stopper which was then secured further at the sides with parafilm. The appropriate solvent (30 $cm^3$) freshly distilled was added via syringe to the solid material and the suspension was cooled to $-78°$ C. in a dry ice acetone bath. A solution of $N_2O_{4(1)}$ (2 $cm^3$, 31 mmol) in $CH_2Cl_2$ (10 $cm^3$) at $-78°$ C. was then added via syringe to the vigorously stirred suspension at $-78°$ C. which was then allowed to warm to $-25°$ C. over 20 minutes. After a further 20 minutes at $-25°$ C., the suspension was washed rapidly in turn with 30 $cm^3$ each of saturated solutions of NaCl, $NaHCO_3$ and NaCl at $-5°$ C. The organic phase was dried by rapid stirring over anhydrous $Na_2SO_4$ in an Erlenmeyer flask capped with a secured serum stopper at $-40°$ C. for 5 minutes, filtration then evaporation under oil pump pressure at $-30°$ C. to yield a yellow to golden yellow oil.

All chemicals were reagent grade; most were used without further purification. All solvents (hexane, cyclohexane, methylene chloride) were distilled from appropriate dessicants (a sodium-lead alloy for hexane and cyclohexane; $P_2O_5$ for methylene chloride) before using.

Solvent selection was governed by the following criteria: (1) dissolved the nitrosoamide, the monomer, and the polymer; (2) was inert to the carbocation; (3) was reasonably volatile; (4) warranted use by presence of a significant monomer exotherm; or (5) minimized crosslinking of monomers. The following table summarizes some preferred embodiments for combining the N-alkyl-N-nitrosoamide, the monomer and the solvent, if applicable:

TABLE 1

| N-alkyl-N-nitrosoamide | Monomer | Solvent |
| --- | --- | --- |
| N-4-methoxybenzyl-N-nitrosopivalamide | Styrene | Cyclohexane |
| N-benzyl-N-nitrosopivalamide | Styrene | Cyclohexane |
| N-benzyl-N-nitrosopivalamide | Styrene | Methylene Chloride |
| N-benzyl-N-nitrosopivalamide | Isobutylene | Methylene Chloride |
| N-benzyl-N-nitrosopivalamide | Isoprene + Isobutylene | Methylene Chloride |
| N-benzyl-N-nitrosopivalamide | Isoprene + Isobutylene | Cyclohexane |
| N-cyclohexyl-N-nitrosopivalamide | Cyclohexene | None |

The preferred embodiments are also discussed in the following examples:

EXAMPLE 1

Reagent grade styrene was distilled from a sodium-lead, alloy under vacuum at oil pump pressure prior to use and stored under argon. The appropriate solvent (40 $cm^3$) and liquid monomer (30 $cm^3$, 87.2 mmol) both freshly distilled were introduced via argon-purges syringes into a 300 $cm^3$ argon-purged Morton flask reactor. The N-alkyl-N-nitrosopivalamide solution (30 $cm^3$) was then introduced via syringe (pre-cooled to $-5°$ C.) into the reactor; the solution was stirred vigorously and the temperature was maintained at the required temperature (25–40° C.) for 5 hours. After 5 hours, the apparatus was disassembled and the solution was poured into 2 L of methanol and the resulting suspension was filtered and the residue was air dried to yield a white flaky solid. A 16.5% yield of polystyrene of viscosity average molecular mass=$1.25 \times 10^6$ and mp=165° C. obtained.

EXAMPLE 2

Reagent grade isoprene was distilled from a sodium-lead alloy under vacuum at oil pump pressure prior to use and stored under argon. The appropriate solvent (40 $cm^3$) and isoprene (30 $cm^3$, 87.2 mmol) were introduced via argon-purges syringes into a 300 $cm^3$ argon-purged Morton flask reactor. The N-alkyl-N-nitrosopivalamide solution (30 $cm^3$) was then introduced via syringe (pre-cooled to $-5°$ C.) into the reactor; the solution was stirred vigorously and the temperature was maintained at the required temperature (25–40° C.) for 5 hours. After 5 hours, the apparatus was disassembled and the product mixture was poured into a clean 20 cm×20 cm×5 cm glass baking pan and was loosely covered with aluminum foil into which small holes were punched. The assembly was placed in a hood to evaporate. The polymer was then scraped off using a clean, new razor blade.

EXAMPLE 3

Reagent grade cyclohexene was distilled from a sodium-lead alloy under vacuum at oil pump pressure prior to use and stored under argon. The appropriate solvent (40 $cm^3$) and cyclohexene (30 $cm^3$, 87.2 mmol) were introduced via argon-purges syringes into a 300 $cm^3$ argon-purged Morton flask reactor. The N-alkyl-N-nitrosopivalamide solution (30 $cm^3$) was then introduced via syringe (pre-cooled to $-5°$ C.) into the reactor; the solution was stirred vigorously and the temperature was maintained at the required temperature (25–40° C.) for 5 hours. After 5 hours, the apparatus was disassembled and the product mixture was poured into a clean 20 cm×20 cm×5 cm glass baking pan and was loosely covered with aluminum foil into which small holes were punched. The assembly was placed in a hood to evaporate. The polymer was then scraped off using a clean, new razor blade.

EXAMPLE 4

Reagent grade isobutylene was used directly from the lecture bottle. Isobutylene introduced in a constant stream under pressure into a Parr reactor was polymerized using N-benzyl-N-nitrosopivalamide at 40° C. in a dry 10% (vol/vol) methylene chloride/cyclohexane. The appropriate solvent (50 $cm^3$) was introduced via argon-purge syringe into a 300 $cm^3$ argon-purged Parr reactor. The N-alkyl-N-nitrosopivalamide solution (50 $cm^3$) was then introduced via syringe (pre-cooled to $-5°$ C.) into the reactor. The reactor was attached via gas tight pressure fittings to the lecture bottle containing the appropriate gaseous monomer. The gas (30 $cm^3$, 87.2 mmol) was admitted to the reactor at pressures ranging from 30–100 psi after addition of the nitrosoamide solution and the reaction solvent. The solution was stirred vigorously and the temperature was maintained at the required temperature (25–40° C.) for 5 hours. After 5 hours, the resultant colorless solution was then poured into methanol to precipitate the isobutylene. The product mixture was poured into a clean 20 cm×20 cm×5 cm glass baking pan and was loosely covered with aluminum foil into which small holes were punched. The assembly was placed in a hood to evaporate. The polymer was then scraped off using a clean, new razor blade.

While it is understood that the invention described herein is characterized by N-alkyl-N-nitrosoamides used to generate highly reactive carbocations through deamination that subsequently produce high molecular weight polymers, it is apparent that the foregoing description of specific embodiments can be readily adapted for various applications without departing from the general concept. Such adaptions and modifications are intended to be comprehended within the range of equivalents of disclosed embodiments. Terminology used herein is for the purpose of description and not limitation.

There are, of course, other alternate embodiments which are obvious from the foregoing descriptions of the invention, which are intended to be included within the scope of the invention, as defined by the following claims.

We claim:

1. A method of cationic polymerization or oligomerization comprising the steps of:
   (a) preparing a carbocation initiator by deamination; and
   (b) combining said carbocation initiator with an unsaturated monomer to form a mixture.

2. The method of claim 1, further comprising the step of maintaining the temperature of said mixture below 100° C.

3. The method of claim 1, further comprising the step of combining said carbocation initiator, said monomer, and a solvent.

4. The method of claim 3, wherein said solvent is non-nucleophilic to said carbocation initiator.

5. The method of claim 4, wherein said solvent is selected from the group consisting of hexane, cyclohexane, and methylene chloride.

6. The method of claim 1, wherein said monomer reacts with said carbocation initiator to form a daughter intermediate ion that has secondary, tertiary, or resonance-stabilized structure.

7. The method of claim 6, wherein the monomer is selected from the group consisting of styrene, isoprene, cyclohexene, and isobutylene.

8. The method of claim 1, wherein said carbocation initiator is selected from the group consisting of a secondary carbocation, a tertiary carbocation and a resonance-stabilized carbocation.

9. The method of claim 1, wherein said carbocation initiator is generated by the thermolysis of N-alkyl-N-nitrosoamides.

10. The method of claim 1 wherein said carbocation initiator is prepared by deamination of a nitrogen-containing carbocation precursor, wherein said carbocation precursor dediazoniates to form an ion pair separated by an inert nitrogen-containing compound.

11. A method of polymerizing styrene comprising the steps of:
    (a) preparing a carbocation initiator by thermolysis of a N-alkyl-N-nitrosoamide; and
    (b) combining said carbocation initiator with styrene monomer and a solvent to form a mixture.

12. The method of claim 11 wherein said solvent is hexane.

13. The method of claim 11, wherein said N-alkyl-N-nitrosoamide is N-4-substituted-benzyl-N-nitrosopivalamide.

14. The method of claim 11, wherein said N-alkyl-N-nitrosoamide is N-4-methoxybenzyl-N-nitrosopivalamide.

15. The method of claim 11, further comprising the step of allowing said N-alkyl-N-nitrosamide to substantially decompose.

16. A method of polymerizing isobutylene comprising the steps of:
    (a) preparing a carbocation initiator by thermolysis of a N-alkyl-N-nitrosoamide; and
    (b) combining said carbocation initiator with isobutylene monomer and a solvent to form a mixture.

17. The method of claim 16, wherein said solvent is cyclohexane.

18. The method of claim 16, wherein said N-alkyl-N-nitrosoamide is N-4-substituted-benzyl-N-nitrosopivalamide.

19. The method of claim 16, wherein said N-alkyl-N-nitrosoamide is N-4-methoxybenzyl-N-nitrosopivalamide.

20. The method of claim 16, further comprising the step of allowing said N-alkyl-N-nitrosamide to substantially decompose.

21. A method of cationic copolymerization comprising the steps of:
    (a) preparing a carbocation initiator by deamination; and
    (b) combining said carbocation initiator with a first monomer and a second monomer to form a mixture.

22. The method of claim 21, further comprising the step of combining said carbocation initiator, said first and second monomer, and a solvent.

23. The method of claim 22, wherein said solvent is non-nucleophilic to said carbocation initiator.

24. The method of claim 23, wherein said solvent is selected from the group consisting of hexane, cyclohexane, and methylene chloride.

25. The method of claim 21 wherein said carbocation initiator is prepared by deamination of a nitrogen-containing carbocation precursor, wherein said carbocation precursor dediazoniates to form an ion pair separated by an inert nitrogen-containing compound.

* * * * *